(No Model.)

E. MICHELIN.
PNEUMATIC TIRE.

No. 497,453.      Patented May 16, 1893.

Witnesses:—
George Barry.
C. E. Sundgren

Inventor:
Edouard Michelin
by attorneys
Brown & Seward

United States Patent Office.

EDOUARD MICHELIN, OF CLERMONT-FERRAND, FRANCE, ASSIGNOR TO MICHELIN & CO., OF SAME PLACE.

PNEUMATIC-TIRE.

SPECIFICATION forming part of Letters Patent No. 497,453, dated May 16, 1893.

Application filed August 5, 1892. Serial No. 442,212. (No model.) Patented in France September 11, 1891, No. 216,052, and in England September 11, 1891, No. 6,640.

*To all whom it may concern:*

Be it known that I, EDOUARD MICHELIN, a citizen of the Republic of France, residing at Clermont-Ferrand, in said Republic, have invented a new and useful Improvement in Pneumatic Wheel-Tires and in Fellies Employed with such Tires (which has been patented in France by brevet d'invention No. 216,052, dated September 11, 1891, and in Great Britain by Patent No. 6,640, applied for April 6, 1892, antedated September 11, 1891), of which the following is a specification.

This invention is especially designed for the wheels of velocipedes though it may be applicable to the wheels of other vehicles.

It relates to that kind of pneumatic tire which comprises two distinct and independent parts, viz: an air chamber constituted by an elastic tube and a rolling surface or exterior protective envelope constituted not by a complete tube but by a band which envelops the air chamber and of which the two edges are affixed to the felly to attach to the wheel the said band itself as well as the air chamber.

The improvement has especially for its object to permit the rapid removal of the exterior tire for the purpose of changing or repairing the air chamber in case of its becoming broken or deteriorated.

It consists in the combination, as hereinafter described and claimed with an open exterior tire the edges of which are flanged externally, and with a felly furnished on each side with a throat or gutter in which is engaged one of the flanged edges of the said tire, of hoops or rings which, when the said edges of the tire have been introduced into the throats or gutters of the felly, close the openings of the said throats or gutters, that is to say, completely fill the spaces between the body of the felly and the exterior walls of its throats, said hoops or rings having sufficient height or thickness to prevent them from coming out of the throats and serving to maintain the tire in place by the sole effect of their presence and without the necessity of screwing them upon the flanged or swelled edges of the tire.

The accompanying drawings represent by transverse sections different examples of the constructions which I may adopt in carrying out my invention.

Figure 1 shows in transverse section the mounting of a tire according to my system, with the air chamber not inflated, and Fig. 2 is a corresponding view with the air chamber inflated. Fig. 3 represents in transverse section a hollow felly analogous to that represented in Figs. 1 and 2 but of less costly construction. Fig. 4 represents in transverse section a construction of the felly in which Figs. 6, 7, and 8 represent the constructions in which the continuous throats or gutters shown in the preceding figures are replaced by discontinuous throats obtained either by cutting the felly or by attaching more or less broad hooks to its edges.

In Figs. 1 and 2, A is the felly provided with throats $a$ along its edges.

B is the annular air chamber constituted by a thin tube of supple india rubber as is common.

C is the exterior protective tire bulged outward in the middle and furnished with exterior flanges $c$ upon its edges, the said flanges being only thick enough to fill a portion of the depth of the throats or gutters $a$. This tire which is of simple india rubber is reinforced by cloth as represented in dotted outline.

D D are the metallic rings or hoops by means of which, after the introduction of the flanges $c$ into the throats $a$, the entire spaces $l$ between those portions of the tire outside of the circumference of the flanges and the exterior walls of the said throats are completely filled in such manner that when the air chamber B of the tire is inflated the flanges will be so pressed of themselves against the rings as shown in Fig 2, that they cannot escape because they are so keyed in their positions that they are not permitted to be deformed sufficiently to slide out.

When the rings D D are in place their two extremities may be united to each other or to the felly by any means whatever.

The hoops or rings D in the several examples represented in the drawings are made of metal and hollow but may be of any other suitable material. They have an external diameter such that when they are put in place they lie without pressure upon the flanges c c as shown in Fig. 1; their thickness or height may be varied but it should always be sufficient to prevent them from placing themselves crosswise under the action of the oblique pressure exercised upon them which might permit the flanges to draw out of the throats; on the other hand the interior circumference of the said rings should be considerably less than the circumference of the edges of the gutter or throat in which they are placed.

To enable the air chamber to be removed it is sufficient to take out only one of the hoops or rings D, which is easy by reason of its flexibility, and to draw the exterior tire over to the other side of the felly.

The hoops or rings D D may be each in one or several pieces; for the sake of lightness they will generally be made hollow as shown in the drawings. Any suitable means whatever may be employed to fix them in place.

Figure 1:
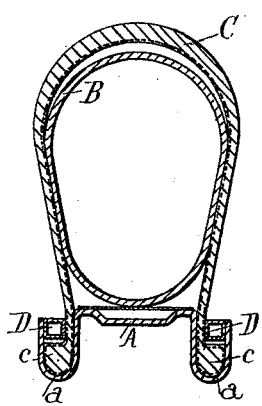
Figure 2:
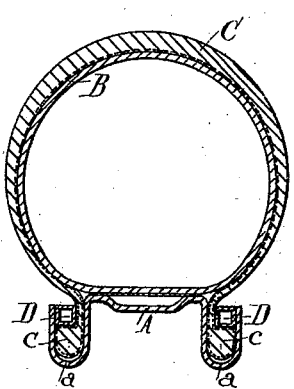
Figure 3:
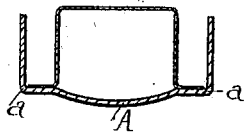
Fig. 3 represents a convenient and economical method of obtaining in two pieces a felly with side throats upon which an externally flanged tire may be affixed according to my invention.
Figure 4:
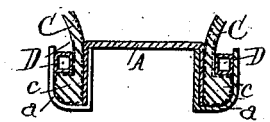
Fig. 4 represents a construction in which the continuous throats are replaced by hooks or discontinuous portions of throats formed at intervals upon the edges of the felly or secured at intervals upon the latter, which in this case has simply the form of a U in transverse section.

What I claim as my invention is—

The combination of a felly having at its sides throats or gutters, an annular air chamber, a flexible protective tire external to said chamber and having on its edges flanges which project laterally outward and are received within the bottoms of said throats or gutters but which only fill a portion of the depth of said throats or gutters and hoops or rings applied within said throats or gutters directly against the outer walls thereof outside of the outer circumference of the said flanges, substantially as herein set forth.

In witness whereof I have hereunto set my hand in the presence of two subscribing witnesses.

EDOUARD MICHELIN.

Witnesses:
ROBT. M. HOOPER,
LOUIS GENÉS.